United States Patent
Lord

(10) Patent No.: US 6,795,639 B1
(45) Date of Patent: Sep. 21, 2004

(54) FOLLOW UP CORRECTION TO EPG FOR RECORDING SYSTEMS TO RESET REQUESTS FOR RECORDING

(75) Inventor: William P. Lord, Fishkill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 855 days.

(21) Appl. No.: 09/665,564

(22) Filed: Sep. 19, 2000

(51) Int. Cl.[7] .................. H04N 5/91; H04N 5/445
(52) U.S. Cl. ............................. 386/83; 725/39
(58) Field of Search .................. 386/83, 46–95, 386/92, 124, 125, 40; 725/39, 46, 56, 58, 87, 86, 101, 140, 152; H04N 5/91, 5/445

(56) References Cited

U.S. PATENT DOCUMENTS 5,526,130 A    6/1996  Kim ........................... 358/335
5,841,433 A   11/1998  Chaney ....................... 345/327
5,956,455 A    9/1999  Hennig ........................ 386/83
5,963,264 A * 10/1999  Jackson ...................... 348/460
2003/0208756 A1 * 11/2003 Macrae et al. ................. 725/34

FOREIGN PATENT DOCUMENTS

DE    019724840 C1 *  1/1999
EP       0738449 B1   10/1996
JP      10177777 A     6/1998
WO       9749237 A1   12/1997

* cited by examiner

Primary Examiner—Robert Chevalier
(74) Attorney, Agent, or Firm—Laurie Gathman

(57) ABSTRACT

A method and device for determining whether an incorrect recording occurred on a recording device. Electronic Program Guide (EPG) information is used to select a program to be recorded. Corrected EPG data is sent after the recording and compared to the time, channel and length of recording to determine if an incorrect recording took place due to a change in scheduling. If so the recording device searches the EPG data for another showing of the program and if found records the next showing.

15 Claims, 3 Drawing Sheets

```
8pm WEDNESDAY
2 SURVIVOR
3 BASEBALL NY METS
4 NEWS
5 WHO WANTS TO BE A MILLIONARE
6 WEATHER
7 CNN
```

FIG. 2A

```
10pm WEDNESDAY
  2 NEWS
> 3 TENNIS - WIMBLEDON
  4 NEWS
  5 NEWS
  6 WEATHER
  7 CNN
```

FIG. 2B

```
CORRECTED EPG
8pm
3 BASEBALL NY METS
11:30
3 NEWS
```

FIG. 2C

```
10pm THURSDAY
2 NEWS
3 TENNIS - WIMBLEDON
4 BASEBALL
5 NEWS
6 WEATHER
7 CNN
```

FIG. 2D

| SHOW | CHANNEL | START | FINISH | STATUS |
|---|---|---|---|---|
| BASEBALL: NY METS | 3 | 8:00PM | 11:30PM | EXTENDED |
| TENNIS: WIMBLEDON | 3 | 10:00PM | 12:00AM | RESCHEDULE |
| NEWS | 3 | 11:30PM | 12:00AM | ADDED |

FOLLOW UP CORRECTION TO EPG FOR RECORDING SYSTEMS TO RESET REQUESTS FOR RECORDING

BACKGROUND OF THE INVENTION

Many known recording systems provide programming information in the form of Electronic Program Guides (EPG) to the recording system. Some EPGs are broadcast continuously such as those from the cable operator while others are downloaded to the recording system on some periodic basis. Many EPGs are interactive and let the user select a program to record from the EPG by moving a highlighted cursor to a program name and selecting the program.

Personal Video Recorders (PVRs) are becoming increasingly popular such as the TIVO personal video recorder. PVRs use a hard drive to record programs rather than using a tape such as in a VCR. The PVRs also use EPGs and make a daily phone call to download the EPG. The user scrolls through the PVR's EPG to select programs that are to be recorded. These systems simplify the recording process by no longer requiring the user to enter the date, start time, length, and channel number of the program to be recorded. Instead, by scrolling through the EPG, the user selects the title that the user wishes to record. The PVR automatically knows the date, start time, length and channel number from the EPG and records the program.

There are problems with the known systems. Since the program information is loaded on some periodic basis such as early in the morning every day, any subsequent change to that day's schedule is not know to the EPG. This leads to cases when material is unsuccessfully recorded such as when material not requested gets recorded and material requested does not get recorded. For example, when a baseball game extends to 15 innings instead of the normal 9, the game can run 2–3 hours over schedule, preempting other programs that the user may wish to record. The PVR will end up recording the late innings of this game instead of the original program the user wanted recorded. There is no way to detect whether the PVR recorded the incorrect program so that it can record the rescheduled program in the future.

SUMMARY OF THE INVENTION

Accordingly, it is an object of the invention to provide a recording device that will automatically record any rescheduled shows that were originally intended to be recorded but due to rescheduling or errors in the EPG they were not recorded.

It is another object of the invention to send a corrected version of the previous day's EPG to the recording device. The recording device will then detect when it recorded an incorrect show and either delete the show and/or set itself up again to record the rescheduled show by searching the EPG for the rescheduled show.

It is a further object of the invention to send a complete corrected EPG and the recording device will compare the previously sent EPG to the corrected EPG to find discrepancies.

It is yet another object of the invention to send only the changes to the previous day's EPG to the recording device.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts that are adapted to effect such steps, all as exemplified in the following detailed disclosure, and the scope of the invention will be indicated by the claims.

BRIEF DESCRIPTION OF THE DRAWINGS

For a better understanding of the invention reference is made to the following drawings.

FIG. 2a shows an EPG schedule which is sent to the PVR on Wednesday morning;

FIG. 2b shows the selection of a tennis match to be recorded on Wednesday evening;

FIGS. 2c and 2e show several forms of the corrected EPG data which may be sent to the PVR on Sunday morning;

FIG. 2d shows that the PVR has selected the rescheduled tennis match to be recorded based on the corrected EPG data; and FIG. 3 shows a flow chart in accordance with the invention.

DETAILED DESCRIPTION OF THE PREFERRED EMBODIMENTS

Figure 1A:
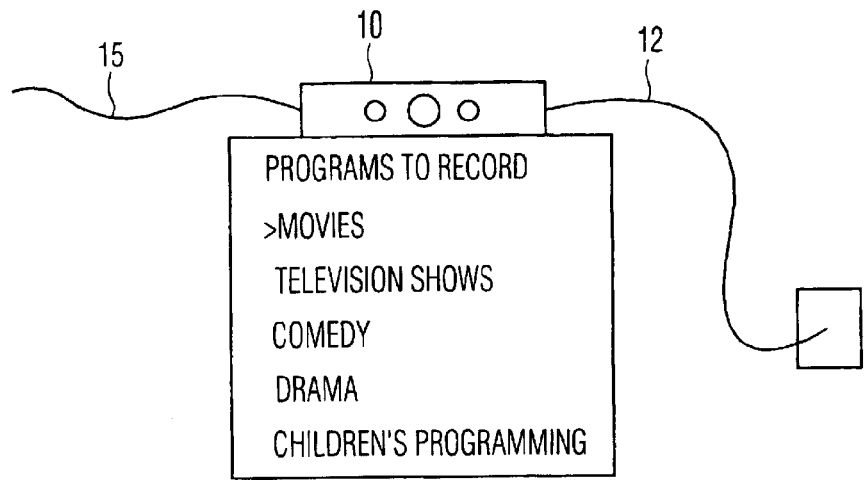
FIGS. 1A and 1B show a PVR in accordance with the invention.

FIG. 1a shows a video recording system in accordance with a preferred embodiment of the invention. A PVR 10 is connected to a television 11 and to the phone system 12 (or other communication path) to receive the EPG data. The EPG 13 is displayed on the television 11 and provides a cursor for navigating through the program menus. The broadcast source (e.g. TV antenna, cable, satellite) 15 provides the TV content to be recorded.

Figure 1B:
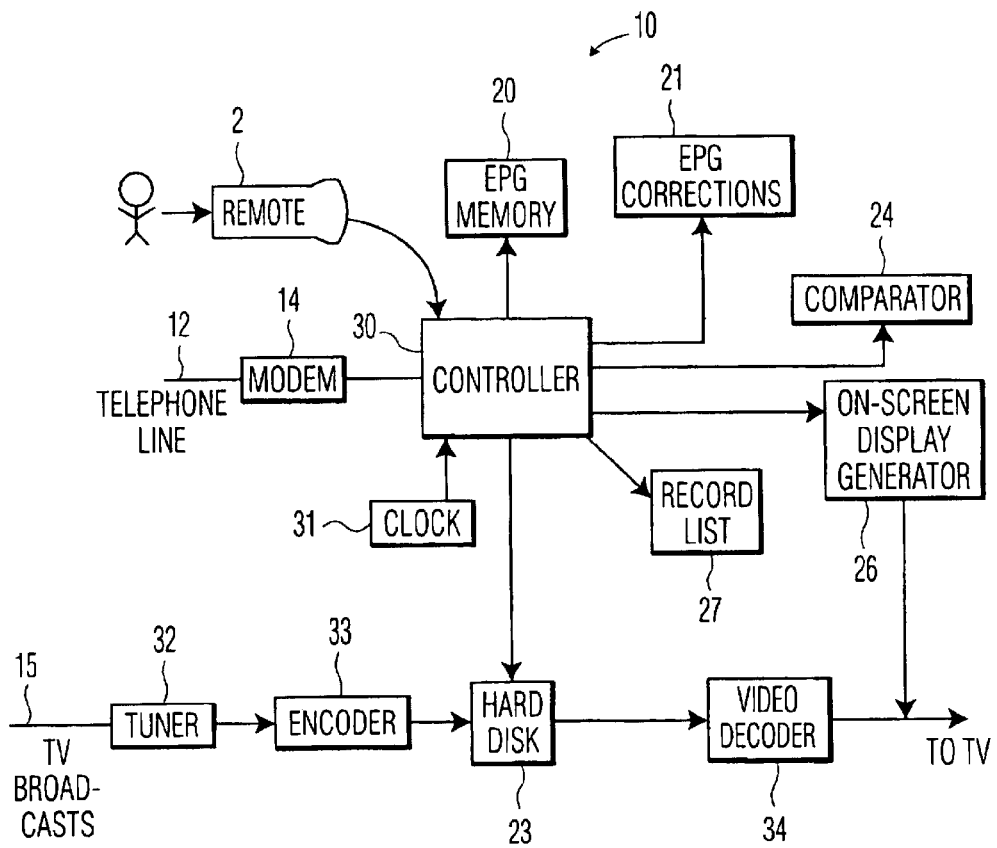

FIG. 1b shows some components of the PVR 10. It includes a controller 30, a remote control 2, a modem 14, an EPG memory 20, an EPG correction memory 21, a comparator 24, an on-screen display generator 26, a record list memory 27, a clock 31, a tuner 32, an encoder 33, a hard disk 23 and a decoder 34. The PVR 10 makes a telephone call via telephone line 12 and modem 14 each morning to download the EPG to the EPG memory 20. Using the user interface 13 generated by the on-screen generator 26 a user navigates through the menus to select a program to be recorded. The PVR 10 records the selected program and stores it on the hard drive 23. The following morning another telephone call is made to download new EPG data and corrected EPG data for the previous day's rescheduling of programs. The corrected EPG data is stored 21 and compared 24 with the previous day's recordings 27. The comparator 24 determines whether or not the corrected EPG data involves the same time and channel number of any previous day's recording. If it did, then the PVR searches in the EPG memory 20 for the program title which was supposed to be recorded previously to see if it is in the upcoming program schedules. If it finds the rescheduled program or another showing of the same program, or a subsequent episode it automatically programs itself to record that showing.

Figures 2E, 3:
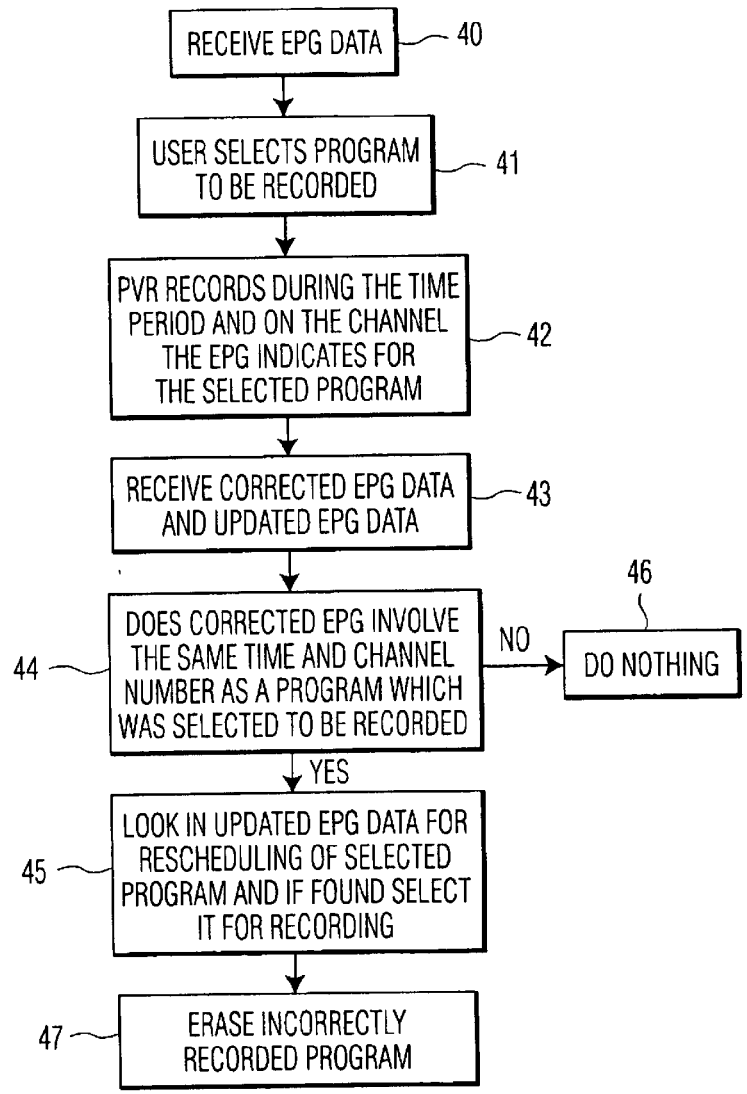

FIGS. 2a–2e show an example of the EPG's and corrected EPG. At 8 PM on Wednesday night there are various shows that can be selected to be recorded. None of these shows are selected but there is a baseball game which will be shown on channel 3 which starts at 8 PM. The broadcaster anticipates that the baseball game will end at 10 PM, so as seen in FIG. 2b, the tennis match is supposed to be shown next on channel 3 at 10 PM. The user navigates through the EPG and selects the tennis match for recording and the PVR knows that the tennis match is on Wednesday night at 10 PM on channel 3 for two hours. The PVR then records this channel during this time period.

Thursday morning a telephone call is made and new EPG information is downloaded along with corrected EPG data.

The corrected EPG data FIGS. 2c and 2e indicates that the Wednesday night baseball game on channel 3 did not end at 10 PM, but ended at 11:30 PM. This is 1 ½ hours into the tennis match. This corrected EPG data is shown in FIGS. 2c and 2e but typically not displayed to the user. It is more likely sent in a database format as shown in FIG. 2e. The PVR compares the corrected EPG data to the previous programs selected to be recorded to determine if there was a program selected to be recorded on Wednesday night on channel 3 from 10:00–11:30 PM. Since the user selected to record the tennis match at this time, the PVR now knows it recorded an incorrect program from 10:00–12:00 midnight or didn't record the entire tennis match because it started late. At this point the PVR could delete the recording (i.e. permit recording over the program erroneously recorded) it recorded Wednesday night or keep it if part of the tennis match was in fact recorded. In this case the corrected EPG data shows that the baseball game ended at 11:30 p.m. and the news was shown from 11:30 p.m. to 12 midnight. The PVR then searches the new EPG data for the tennis match. The PVR finds that it was rescheduled to be shown on channel 3 at 10 PM on Thursday. It automatically programs itself to record this showing of the tennis match on Thursday night. If the program that the user selected to record was a television show such as "ER" (instead of the tennis match) on Wednesday night and ER was preempted by the baseball game, ER may not be rescheduled but the PVR would just select the next week's showing of "ER" to record.

FIG. 3 shows a flow chart of a preferred embodiment of the invention. The PVR receives the EPG data 40. The user selects from the EPG data a program to be recorded 41. The PVR knows from the program title, the channel number, time, and program length, the length of time it is supposed to record and records at that time 42. The PVR then receives corrected EPG data 43. The PVR compares the corrected EPG data to either the previous EPG data to find the changes and then compares the changes to the program record list 44 or if only the changes have been sent then compares the changes to the programs that were selected to be recorded 44. From this comparison 44 the PVR determines whether any programs were incorrectly recorded. If not then the PVR does nothing 46. If the comparison 44 reveals that there was an incorrect recording, the PVR searches the new EPG data for the rescheduled showing of the program or the next time the program is to be shown 45 and sets itself up to record the next showing. The PVR then can erase or write over the incorrect recording 47 and/or inform the user when an erroneous or incomplete recording has occurred and if and when a corrected recording will occur. The system may also include an option for the user to delete the erroneous recording.

The invention has been described with reference to a PVR but obviously it can be implemented with other recording devices such as VCR's and perhaps in the future DVD's etc. In addition there are many ways to receive the EPG's and the corrected EPG data such as via the cable connection, the internet or, as described, over the telephone lines etc.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

What is claimed is:

1. A video recording system, comprising:
   a recording device operable to record programs;
   an electronic program guide receiver that receives i) an electronic program guide (EPG), and ii) a corrected EPG;
   a programming device for programming the recording device to record programs based on the EPG information; and
   a detector for detecting from the corrected EPG programs that were selected to be recorded but that were unsuccessfully recorded.

2. A video recording system as claimed in claim 1, further including a device for finding from the EPG additional showings of the unsuccessfully recorded programs.

3. A video recording system as claimed in claim 1, further including a device which deletes an erroneously or incompletely recorded program from the recording device.

4. A video recording device, comprising:
   a memory which stores an electronic program guide (EPG);
   a selector which selects from the EPG programs to be recorded;
   a recorder which records the programs selected to be recorded;
   a receiver which receives a corrected EPG;
   a comparator that determines from the corrected EPG programs that were selected to be recorded but that were unsuccessfully recorded.

5. The video recording device as claimed in claim 3, further including a device for determining from the EPG a next showing of the unsuccessfully recorded program, and;
   a programmer for programming the recorder to record the next showing of the program.

6. A video recording system as claimed in claim 4, further including a device which deletes an erroneously or incompletely recorded program from the recorder.

7. The video recording device as claimed in claims 4 and 5, wherein the recorder is a hard drive.

8. The recording device as claimed in claims 4 and 5, wherein the recorder is a VCR.

9. The recording device as claimed in claim 4, wherein the comparator compares the corrected EPG to the stored EPG that was selected to set up a recording and determines if during any time period selected, for a channel selected the EPG indicates an unsuccessful recording occurred.

10. A method of recording, comprising the steps of
    receiving an EPG;
    receiving a user selection of a program to be recorded;
    recording the program;
    receiving a corrected EPG;
    comparing the corrected EPG to the recording time and channel number of the selected program;
    determining if incomplete or erroneous recording of the user selected program occurred; and
    if an incomplete or erroneous recording occurred, then searching the EPG information for a next showing of the user selected program; and recording the next showing.

11. The method according to claim 10, further including the step of deleting the incomplete or erroneous recording.

12. The method according to claim 10, wherein the step of receiving the EPG is performed periodically so that updated EPG information is available.

13. The method according to claim 12, wherein the step of searching is performed on the updated EPG information.

14. The method according to claim 13, further including the step of informing the user that an incomplete or erroneous recording occurred.

15. The method according to claim 14, further including informing the user when a corrected recording will occur.

* * * * *